Dec. 21, 1926.  
T. J MELL  
1,611,218  
METHOD FOR THE MANUFACTURE OF ARTICLES FROM PLASTIC MATERIAL  
Filed Dec. 10, 1923   2 Sheets-Sheet 1

Inventor.  
Tod J. Mell.  
By

Dec. 21, 1926.
T. J. MELL
1,611,218
METHOD FOR THE MANUFACTURE OF ARTICLES FROM PLASTIC MATERIAL
Filed Dec. 10, 1923    2 Sheets-Sheet 2
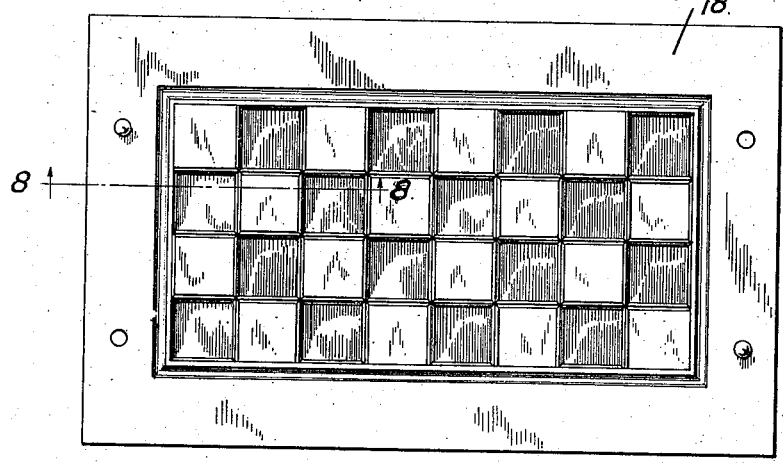
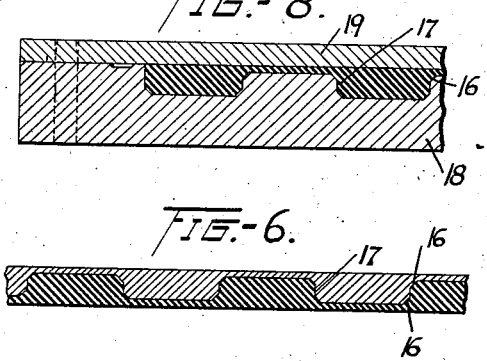
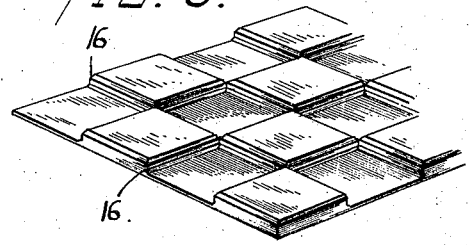
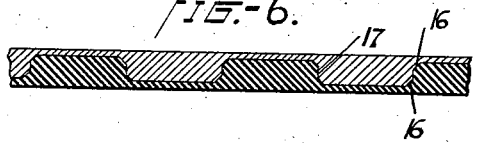
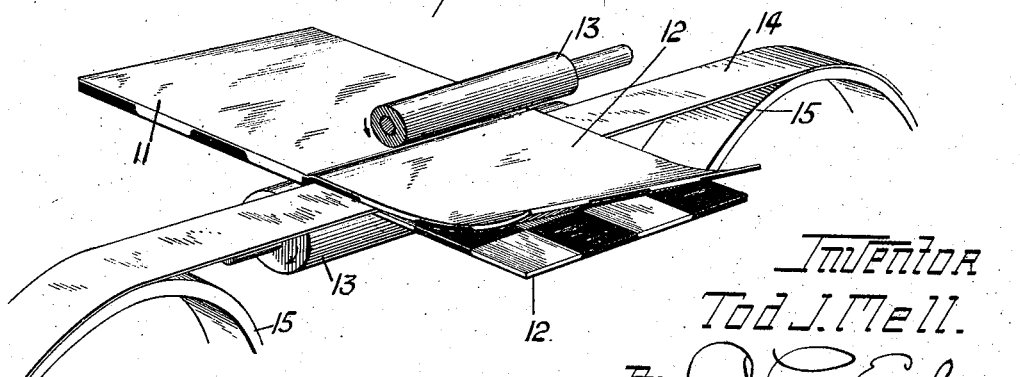
Inventor
Tod J. Mell.

Patented Dec. 21, 1926.

1,611,218

UNITED STATES PATENT OFFICE.

TOD J. MELL, OF SUMMIT COUNTY, OHIO.

METHOD FOR THE MANUFACTURE OF ARTICLES FROM PLASTIC MATERIAL.

Application filed December 10, 1923. Serial No. 679,532.

This invention relates to procedure and apparatus for the manufacture of articles from initally plastic material such as unvulcanized rubber compounds and is of especial value in the manufacture of decorative inlaid sheeting, and especially rubber sheeting.

My chief objects are to provide economical procedure and apparatus for associating masses of plastic stocks of different colors, or differing in other characteristics, in accordance with a determinate geometric plan and for obtaining from the associated masses a plurality of finished articles, such as sheets of floor-covering material, for example, each comprising parts of the original masses of stock, determinately associated in the article.

In the drawings:

Figure 4 is a view showing parts of apparatus similar to a common type of leather splitting machine which may be used for the slitting of the sheets;

Figure 5 is an enlarged detail of a portion of a single sheet showing a preferred form given to the mating portions thereof;

Figure 6 is a section through a composite sheet made from two sheets similar to that shown in Figure 5;

Figure 7 is a plan view of a mold section adapted to be used in a modification of the method of obtaining the decorative elements; and Figure 8 is a section on the line 8—8 of Figure 7 of the mold section there shown, with stock therein and with a mating mold section in place thereon.

The specific form of the invention chosen for the purpose of illustration herein comprises the formation of two sheets of composition material having complementary projections and recesses, uniting the two sheets into a composite sheet and cutting the sheets into a composite sheet and cutting the sheet or slitting it through a centrally located plane so as to obtain two separate decorative sheets. The composite sheet thus formed may be considered as comprising an upper and lower stratum of different colors and an intermediate stratum made up of mating projections integral with their respective strata. While the invention will be described with reference to this type of stock sheet, it is not wholly limited thereto.

Figure 1:
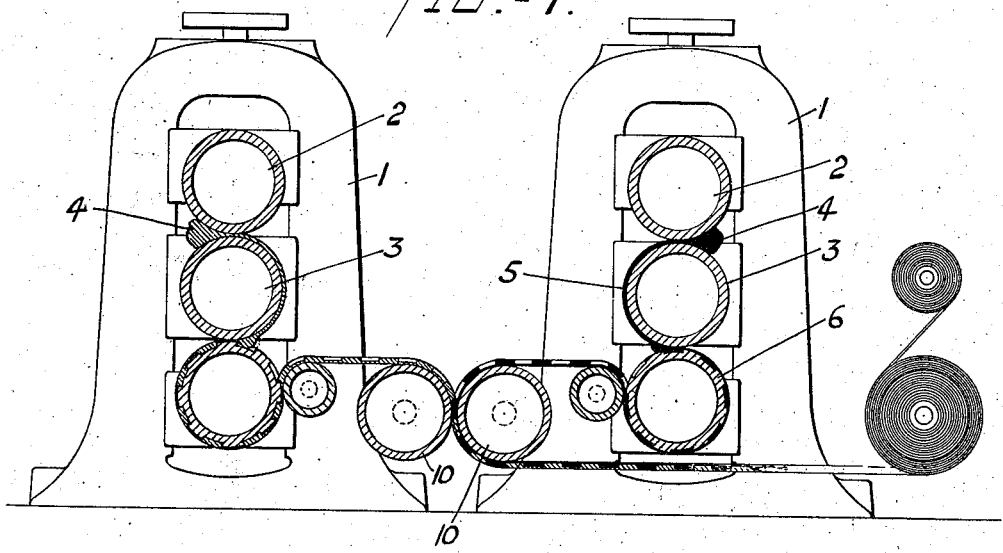
Figure 1 is a sectional view through a pair of calenders which may be used in practising the method of the invention.

In Figure 1 there are illustrated two calenders 1 placed in opposing relation, each calender comprising three rolls, all of which are heated in any suitable manner. The upper rolls 2 and 3 are preferably smooth and a mass or bank of rubber 4 is placed at the entrance to the rolls. This rubber composition is colored in any suitable manner and each calender is designed to operate upon a different colored rubber and by the two rolls the rubber is formed in a sheet 5 of suitable thickness.

The lower roll 6 is formed with a series of depressions 7 and projections 8, and the depressions and projections on one roll are designed to mate with or be complementary to those on the other roll. As the rubber sheet passes from the rolls 3 on to the roll 6, the pressure exerted by the rolls forces the rubber into the surface of the latter roll so that a sheet is formed similar to that shown at 9 in Figure 3.

Figure 3:
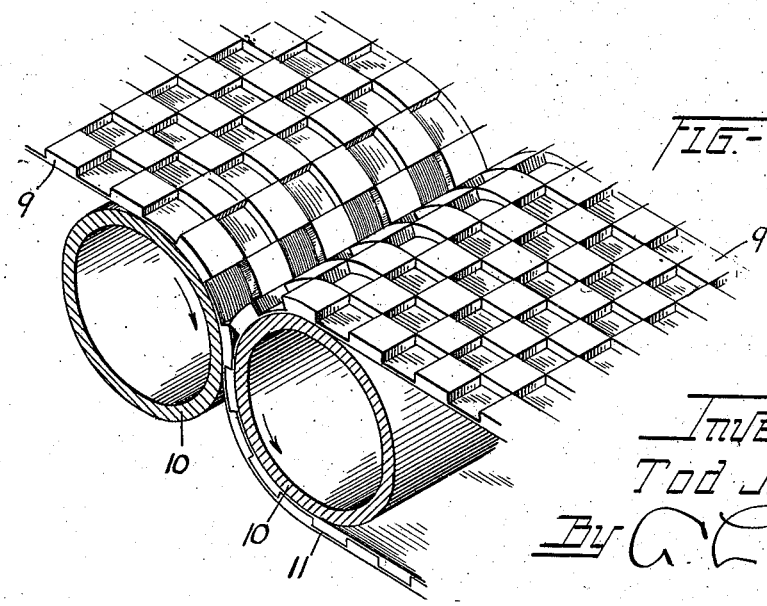
Figure 3 is a fragmentary perspective view showing the preferred procedure for forming a composite stock sheet adapted to be split to produce variegated sheets.

From the lower calender roll the rubber sheets are led to a pair of rolls 10 which may also be heated if desired. These rolls are parallel and spaced slightly apart so that the two sheets of rubber meet and join together with their projections and recesses mating. This action is illustrated in Figures 1 and 3 and it will be observed that in passing around the rolls the sheets tend to mate perfectly. The rolls force the sheets 9 together so that the composite sheet 11 is formed.

At this point it should be noted that in this embodiment of the invention the two sheets are formed with a complete surface over one side, or, in other words, the pattern is not perforated or cut through each sheet, but is simply depressed or formed in relief. The purpose of this feature is to maintain the sheet in its proper form without distortion or stretching. This feature is particularly useful when dealing with a warm rubber sheet which can be easily distorted.

In the formation of the rubber sheeting, the vulcanization may take place at any time, but it is preferable to vulcanize the sheet 11 as it is delivered by the calenders and before the next step, which is the slitting operation, but, for a smooth finish, it may be partially cured, slit, and then completely cured.

Whatever procedure is followed with regard to the vulcanizing of the sheet, the composite sheet 11 is designed to be slit or divided through a central plane, forming two sheets 12, each of which is formed with the desired pattern. My invention is not wholly limited, however, to a single slitting of the composite sheet and the production of only two sheets therefrom. The slitting or slicing operation is preferably performed by means adapted to confine the stock closely in advance of the knife but without pressing it against the faces of the knife. The preferred apparatus for this operation is partly shown in Fig. 4, and comprises a pair of guiding rolls 13, 13, preferably so spaced apart with relation to the thickness of the sheet as to embrace the same tightly as it passes between them, and a band knife 14 mounted upon the usual pulleys 15, one of which is of course provided with driving means, the knife being positioned so as to be adapted to slice the sheet continuously as the latter emerges from the nip of the rolls 13.

After the slicing operation the cut surfaces of the resulting sheets may be smoothed or polished, by grinding, or by the above described further vulcanization after the cutting, in which case the cut surface is of course vulcanized in contact with a suitable smooth surface.

In the manufacture of rubber sheeting in accordance with the particular form of my invention herein described it is preferable to have a tapered or oblique dividing plane between the blocks rather than a plane at right angles to the plane of the sheet. By this construction a better union is obtained between the different blocks, in addition to which feature the mating of the blocks is made more easily. As shown in Figures 5 and 6, the tapering surfaces are provided near the top and bottom of each block or figure of the pattern as indicated by the numeral 16. In certain patterns the tapered sides of the blocks or figures may be continued over the entire meeting surfaces, but in a design such as has been illustrated where the corners of the pattern are in contact, it is necessary to provide a slight area where the sides of the figures are vertical and to cut the composite sheet through the vertical surfaces. These vertical surfaces are designated by the numerals 17.

Figure 2:
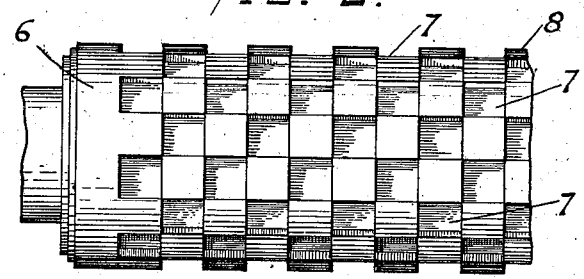
Figure 2 is a detail view of one of the calender rolls.

In Figures 7 and 8 the separate sheets are molded in definite sizes in molds comprising a matrix or female mold 18 and a cover or lid 19. This process is substantially similar to that shown in Figures 1, 2 and 3 except that molds are substituted for the rolls.

Certain features of procedure and apparatus disclosed herein are described and claimed in my copending application Serial No. 42,001, filed July 7, 1925.

Various other modifications may be employed without departing from the scope of my invention, especially as to the manner in which the original stock sheet or mass is assembled or formed.

What is claimed is:

1. The process of manufacturing rubber articles which comprises shaping respective strips of unvulcanized rubber compounds in designs such that design elements of one strip are adapted to interfit with those of another, feeding the strips progressively into association with each other with their design elements interfitting, and dividing the resulting structure to produce a plurality of articles each comprising material of each of the interfitted strips, the said process including a vulcanizing step.

2. The process of manufacturing rubber articles which comprises shaping respective strips of unvulcanized rubber compounds of different characteristics in designs such that design elements of one strip are adapted to interfit with those of another, feeding the strips progressively into association with each other with their design elements interfitting, and dividing the resulting structure to produce a plurality of articles each comprising material of each of the interfitted strips, the materials being subjected to vulcanization both before and after the dividing step.

3. The process of manufacturing patterned sheeting from rubber, comprising the steps of forming sheets from different colored rubber masses, impressing in the sheets recesses and projections in accordance with the desired design, bringing said sheets together with the recesses and projections thereon in mating relation whereby a composite sheet is formed, vulcanizing the rubber, and dividing the sheet along a plane located between the outer surfaces of the composite sheet.

4. The process of manufacturing patterned sheeting from rubber, comprising the steps of forming two sheets from different colored rubber masses, impressing without perforating the sheets with recesses and projections in accordance with the desired design, bringing said sheets together with the recesses and projections thereon in mating relation whereby a composite sheet is formed, and dividing the sheet along a plane located between the outer surfaces of the composite sheet, said process including a vulcanizing step.

5. The process of manufacturing patterned sheeting from rubber, comprising the steps of forming two sheets from different colored rubber masses, impressing without perforating the sheets with recesses and projections in accordance with the desired design, bringing said sheets together with the recesses and projections thereon in mating relation whereby a composite sheet is formed, dividing the sheet along a plane located between the outer surfaces of the composite sheet, and thereafter vulcanizing the rubber.

6. The process of manufacturing decorative inlaid rubber sheeting, comprising forming a single composite sheet having an upper stratum of rubber of one color, a lower stratum of another color and an intermediate stratum made up of mating projections integral with respective upper and lower strata, and dividing the sheet through its intermediate stratum, said process including a vulcanizing step.

TOD J. MELL.